(12) United States Patent
O'Hara et al.

(10) Patent No.: US 8,015,937 B2
(45) Date of Patent: Sep. 13, 2011

(54) CONTINUOUS FEED TABLET COATING SYSTEM

(75) Inventors: David O'Hara, Toronto (CA); James Marjeram, Markham (CA)

(73) Assignee: O'Hara Technologies Inc., Richmond Hill (CA)

( * ) Notice: Subject to any disclaimer, the term of this patent is extended or adjusted under 35 U.S.C. 154(b) by 943 days.

(21) Appl. No.: 11/911,498

(22) PCT Filed: Apr. 12, 2006

(86) PCT No.: PCT/CA2006/000552
§ 371 (c)(1),
(2), (4) Date: Oct. 12, 2007

(87) PCT Pub. No.: WO2006/108280
PCT Pub. Date: Oct. 19, 2006

(65) Prior Publication Data
US 2008/0193632 A1    Aug. 14, 2008

Related U.S. Application Data

(60) Provisional application No. 60/670,271, filed on Apr. 12, 2005.

(51) Int. Cl.
*A01J 27/02*    (2006.01)
(52) U.S. Cl. .................. 118/13; 177/25; 427/3
(58) Field of Classification Search .......... 177/25; 427/3, 212, 214, 215, 220, 221, 242; 118/13
See application file for complete search history.

(56) References Cited

U.S. PATENT DOCUMENTS

| | | | |
|---|---|---|---|
| 2,921,334 A | 1/1960 | Whitsel, Jr. et al. | |
| 3,258,849 A | 7/1966 | Raitt | |
| 3,937,176 A | 2/1976 | Nicholson et al. | |
| 3,991,225 A * | 11/1976 | Blouin | 427/215 |
| 4,708,215 A * | 11/1987 | Nakamura et al. | 177/25.18 |
| 5,010,838 A | 4/1991 | Simelunas et al. | |
| 5,100,683 A | 3/1992 | Singer et al. | |
| 6,365,203 B2 | 4/2002 | DeGady et al. | |

FOREIGN PATENT DOCUMENTS

CA    2455192    7/2005

OTHER PUBLICATIONS

International Search Report by David Chamberlain mailed Jul. 31, 2006.
"Film Coating Compressed Tablets in a Continuous Process," Wesley O. Mancoff, Pharmaceutical Technology, Yearbook 1998, pp. 12-18.
"Continuous Coater," Thomas Engineering Inc. brochure with apparent publication date of May 2000, two pages.

\* cited by examiner

*Primary Examiner* — Dah-Wei Yuan
*Assistant Examiner* — Andrew Bowman
(74) *Attorney, Agent, or Firm* — Price Heneveld LLP

(57) ABSTRACT

A system for coating tablets and other small articles is provided. The system is comprised of an elongate housing containing a drum journalled for rotation about a horizontal axis. The drum has two open ends that receive and discharge a supply of tablets respectively. The drum is rotated about the axis by a drive means to tumble the tablets and advance the tablets through the drum. The system also includes a system for delivering a selected amount of coating to the tablets while they are being tumbled and a feeder for continually feeding tablets at a first end of the housing. The system employs a weir plate for maintaining a depth of tablets within the drum and for controlling the time that the tablets remain in the drum. Finally, the system has a tablet discharge region for receiving tablets for discharge.

19 Claims, 13 Drawing Sheets

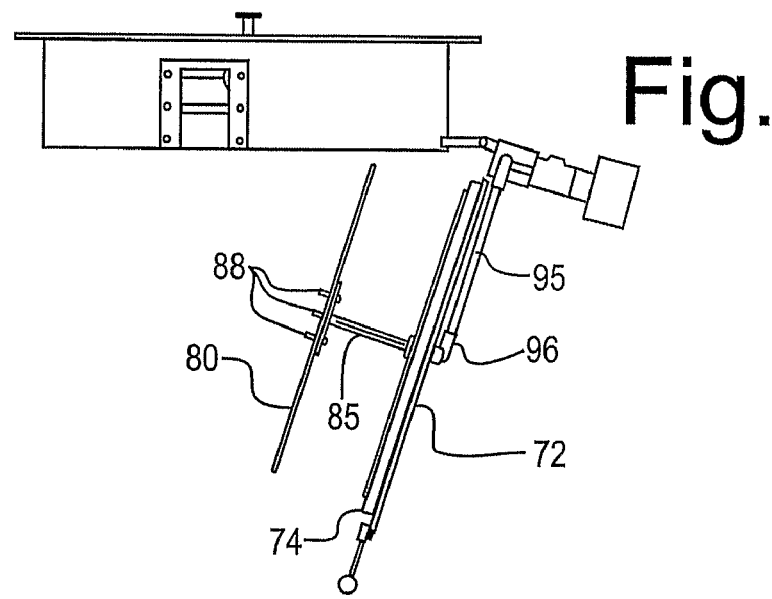
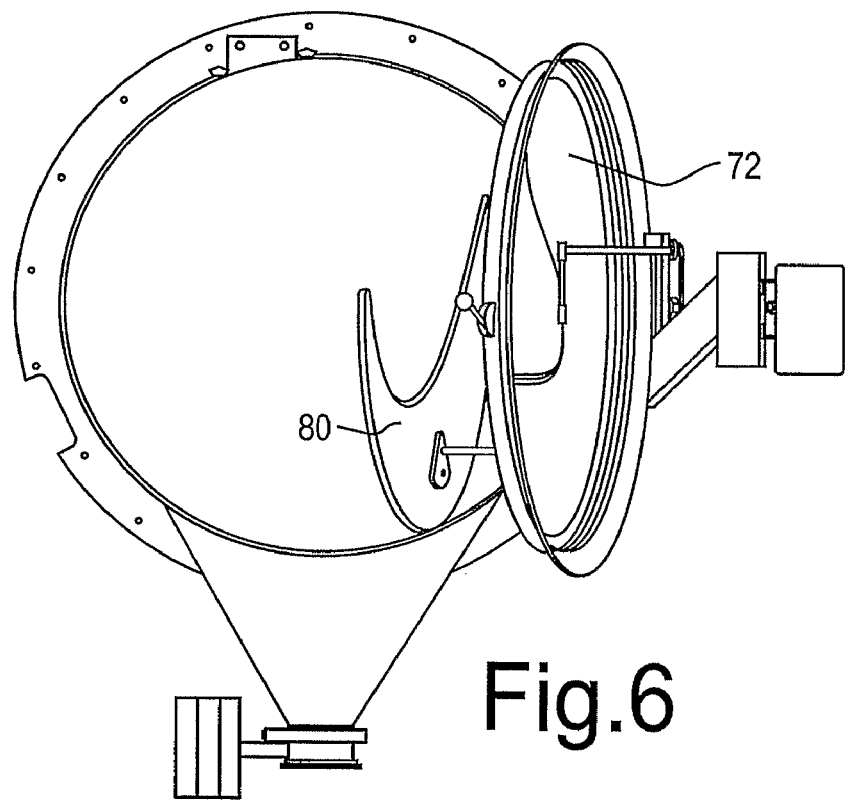

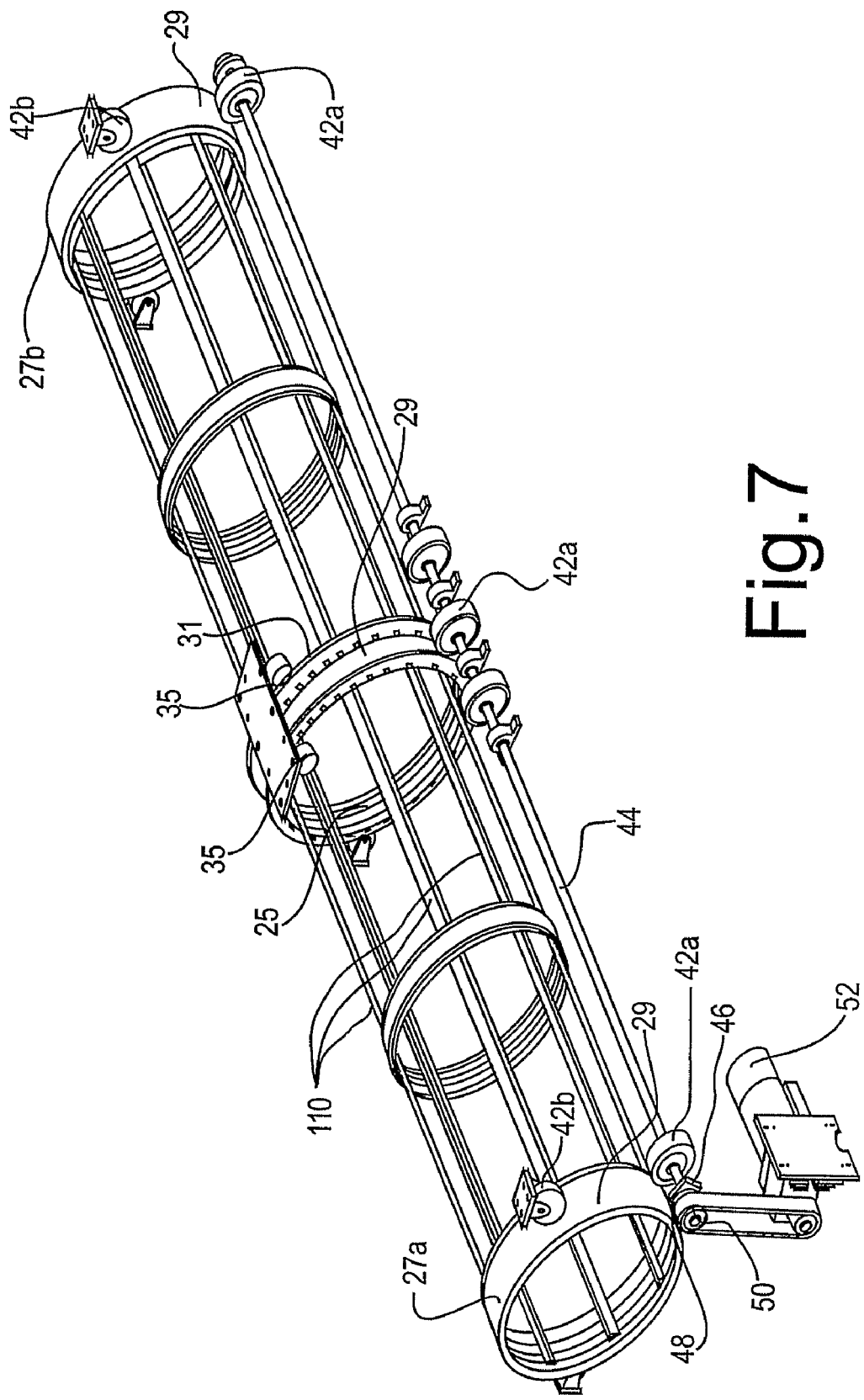

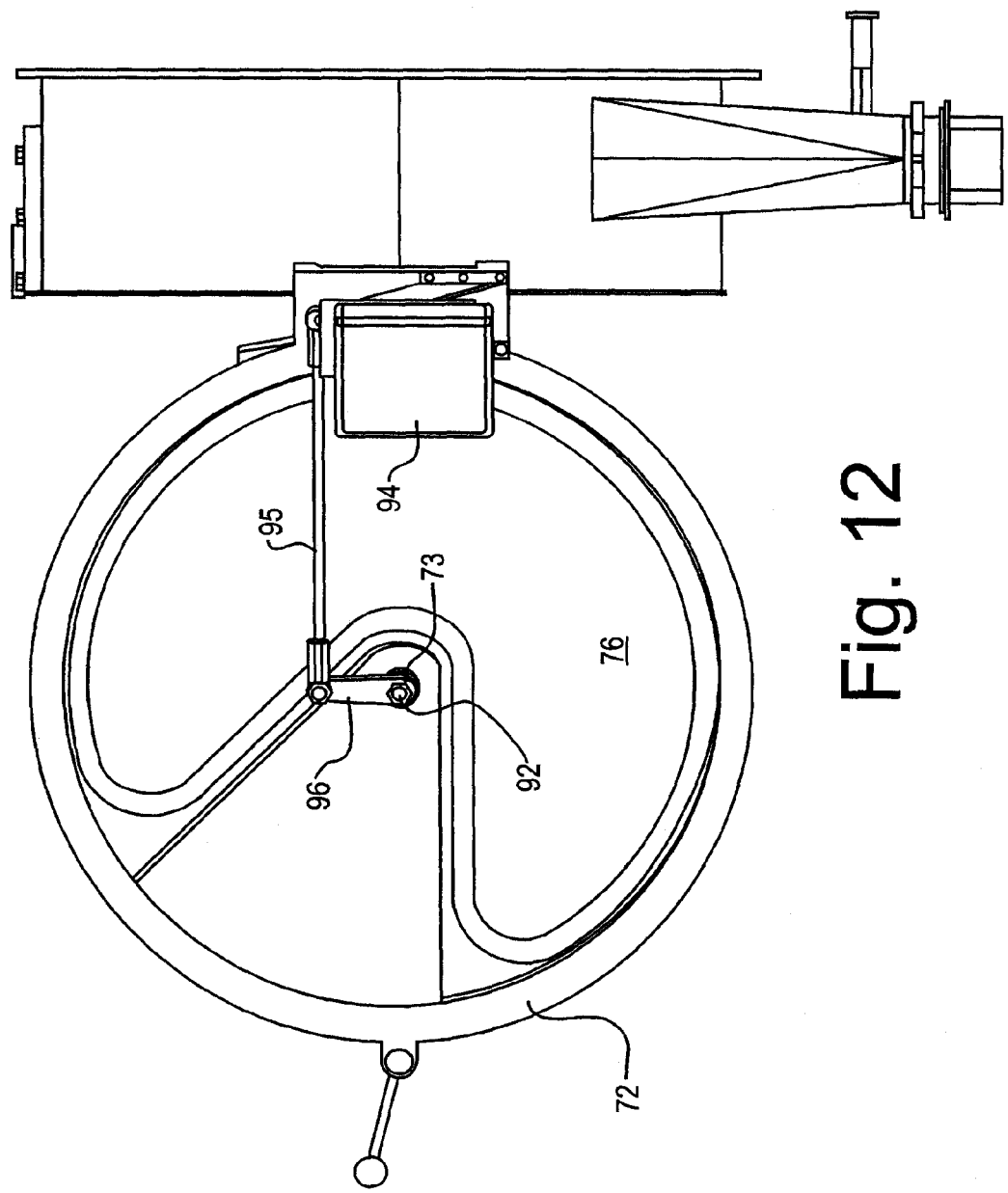

Operating Sequence – Preparation
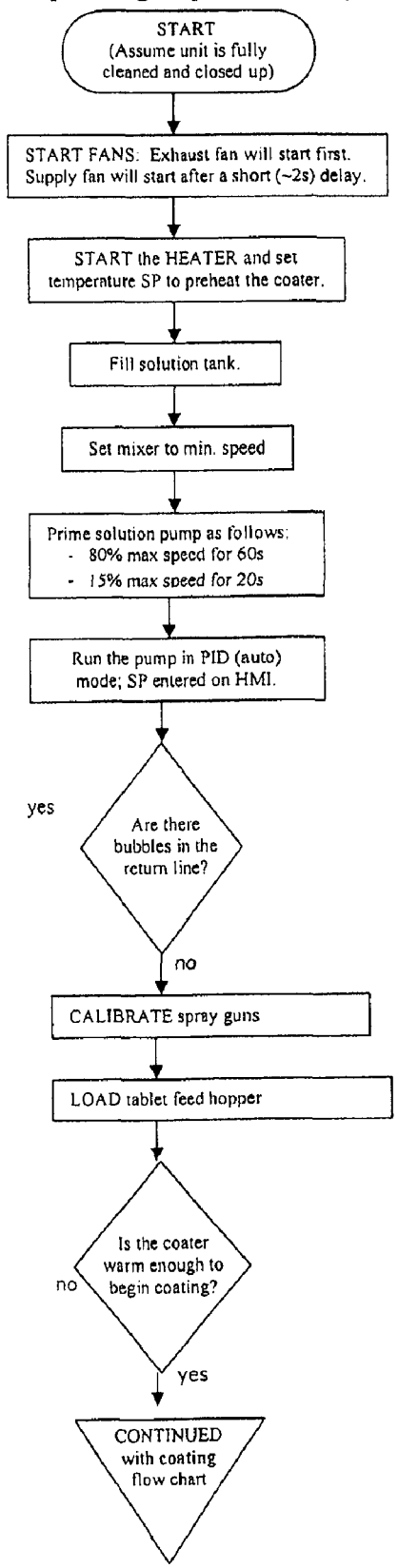
Operating Sequence – Shutdown
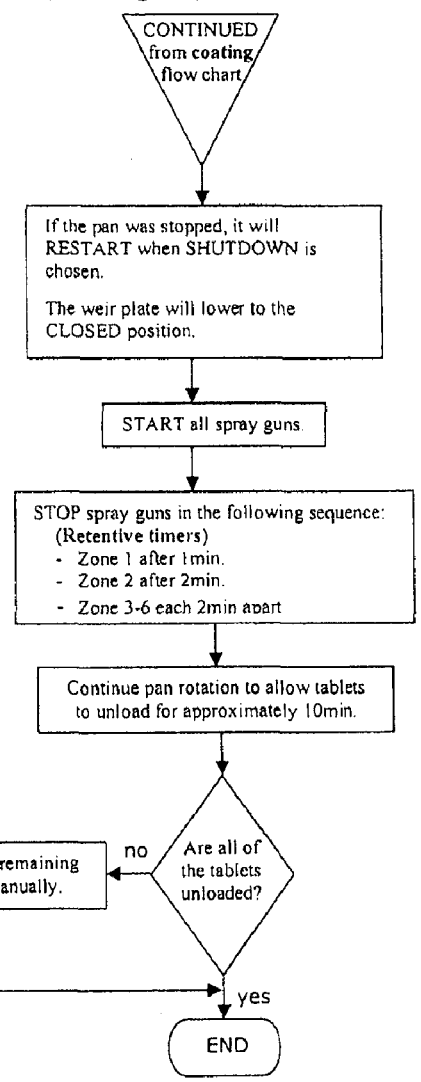
Fig. 13A

CONTINUOUS FEED TABLET COATING SYSTEM

CROSS REFERENCE TO RELATED APPLICATIONS

This application is the National Stage of PCT International Application No. PCT/CA2006/000552 filed internationally on Apr. 12, 2006, which claims the benefit of U.S. Provisional Application No. 60/670,271 filed on Apr. 12, 2005

FIELD OF THE INVENTION

The invention relates to processes and equipment for applying a coating onto tablets such as pharmaceutical tablets and similar articles, including without limitation small candies, seeds and the like. More specifically, the invention relates to systems which apply a spray-on coating within a horizontal axis tumbler.

BACKGROUND OF THE INVENTION

Coatings for tablets for human or animal consumption (as for other uses) may be applied with a system consisting of a rotating horizontal-axis drum for tumbling the tablets while a coating substance is sprayed within the drum. Typically, the drum is perforated to permit a flow of heated air through the drum wall to facilitate drying. As well, perforations permit cleaning fluid to readily drain. Such perforations may take on a variety of shapes and sizes suitable to the desired application. Tablet coating systems are used in a variety of other applications, for example in pharmaceuticals and for coating of candies. As well, such systems may be used for coating seeds. Tablets are typically produced in a wide range of shapes, sizes and densities. Accordingly, any system for coating the tablets or the like should be capable of efficient coating of a range of tablet types. A typical such system includes a housing, a horizontal-axis perforated drum journaled for rotation within the housing, drive means for rotating the drum, for example an electric motor which may be external to the housing and operatively connected to the drum, for example by a belt or chain drive, means for introducing uncoated tablets into the drum and for removing the coated tablets following the coated process.

Such a system requires a means for spraying or otherwise introducing a coating such a liquid coating solution into the drum. For pharmaceutical use a high level of precision in the coating process is required in order to maintain a controlled thickness and weight of coating. Preferably, the system includes a means for introducing a flow of air through the drum wall, for example heated air to facilitate the drying process. Finally, the system should permit thorough washing of components which are in contact with the tablets and spray liquid. Washing of the equipment may be provided by means of fully or semi-automatic systems or a fully-manual approach.

Tablet coating systems are described in U.S. Pat. No. 4,725,446 to Forster et al., which describes a rotateable horizontal axis drum having a perforated wall. A supply of drying air flows through the wall. Coating solution is sprayed onto the tumbling tablets via a sprayer centrally positioned within the drum directed generally downwardly towards the tumbling bed of pills within the drum interior.

Prior art systems generally provide for batch processing of tablets, which is relatively inefficient in comparison with a continuous industrial process. However, batch processing generally requires simpler equipment, particularly in the pharmaceutical processing context in which a high level of precision is required in supplying a selected amount of coating for a given batch size of tablets as well as tablet dwell time within the drum. Thus, it is relatively simple to introduce a carefully measured batch size of tablets into the drum and thereupon apply a measured amount of coating to the tablets. Continuous processing, while more efficient, introduces difficulties in terms of consistency of the coating process.

Another aspect of coating systems, particularly in the pharmaceutical industry, relates to rinsing and washing of the equipment, particularly those components in contact with the product. A high standard of cleanliness applies to the equipment, in particular when the machine is switched from one product to another. It is desirable to provide a convenient system for spraying a cleaning solution throughout the drum interior, with minimal worker contact with the equipment.

SUMMARY OF THE INVENTION

An object of the invention is to provide a system for coating tablets and other small articles such as seeds (all such small articles are referred to herein for convenience as "tablets"), operable in a continuous processing operation wherein tablets may be both introduced and discharged at a continuous rate. A further object is to provide a system which optionally is operable in both batch and continuous modes and able to switch seamlessly from one to the other mode. For example, upon system startup the system may be operate in a batch mode, and then shifted into continuous operation in order to minimize waste of coating fluid. A further object is to provide an improved tablet coating system having a horizontal axis drum, including improved means for washing the tablet-coating drum and other components in contact with the tablets.

In one aspect the invention comprises a tablet coating system comprising:

a) an elongate housing having an elongate axis extending lengthwise, first and second ends at the opposing ends of the elongate axis and opposing lateral sides alongside the elongate axis;

b) a drum within the housing, journalled for rotation about a horizontal axis extending between the housing ends, having a first end for receiving tablets and an open second end for discharging tablets, such that tablets are received in the first end of the drum are tumbled within the drum as the drum rotates while being coated and optionally also dried, and discharged from the other end. The tablets are transited along the drum by the rotary action of the drum combined with the introduction of additional tablets into the first end and discharge from the second end;

c) drive means for rotating the drum. Any suitable drive means may be provided such as an electric motor;

d) a delivery system for delivering coating within the drum for coating the tablets, such as a sprayer positioned within the drum for delivering a liquid coating material onto the tablet bed;

e) a feeder such as a weigh-in feeder for dispensing a stream of bulk tablets on a continuous basis into the first end of said housing, the stream comprising a selected rate, for example, by weight, of bulk tablets;

f) a weir plate partly obstructing the open second end of the drum for maintaining within the drum a selected depth of tablets wherein excess tablets spill over said weir plate, wherein the weir plate is mounted for adjusting its position relative to the housing to selectively vary its effective spill-over height relative to the drum for adjusting the depth of the tablet bed within the drum, thereby permitting convenient selection of tablet dwell time within the drum; and optionally, g) a tablet discharge region to receive coated tablets spilling over said weir plate for discharge from said system.

Preferably a controller is operatively connected to at least the weigh-in feeder to control operation. The controller may also be operatively connected to the drum drive means and liquid delivery system.

The height of the weir plate controls the average tablet dwell time within the drum. Rotation of the drum causes the tablets to tumble and to move from the first end to the second end as tablets are introduced at the first end and discharged from the second end. Thus, as the weir plate is elevated the tablet bed depth is increased within the drum, thereby increasing the average dwell time.

The feeder preferably comprises a weigh-in feeder, which dispenses the tablets at a selected rate. The feeder may consist of a scale for weighing a stream of tablets passing over said scale, with a conveyor belt or other tablet transport system to carry tablets in bulk across said scale while being weighed, and a controller which determines the weight on a real time basis of tablets being conveyed into the system on a weight/time basis. The feeder also includes a dispenser for delivering a controllable stream of tablets to said scale. The controller is operatively connected to said scale and dispenser to receive signals from said scale and to control the amount of tablets delivered to said scale so as to maintain said selected constant flow of bulk tablets as a selected weight/time stream. Alternatively the feeder may dispense a controlled flow of tablets on a basis other than weight.

The system may be operated to process tablets in either of a batch or continuous processing operation. Preferably the system is controlled to permit an initial batch process upon startup, which then is changed with no or minimal interruption into a continuous processing mode.

According to one aspect, the weir plate is generally crescent-shaped, with the concave edge facing upwardly and a substantially semi-circular lower edge which corresponds with the curvature of the drum wall. In a further aspect, somewhat from a perfect crescent shape, in that the upper edge is asymmetric and comprises a generally flat first part merging with a generally hyperbolic second part. The weir plate is rotably mounted so as to selectively vary the obstruction of said drum so as to increase or decrease the depth of tablets within said drum, and operatively connected to the controller so as to control positioning of the weir plate. According to another aspect, the weir plate has an upper edge which is concave and departs from a fully curved shape in that it consists of a straight region merging with a curved region. The weir plate is preferably mounted to the housing via a horizontal shaft which extends through the second end wall of the drum coaxially with the drum. A link extends radially from the shaft to connect the shaft to the weir plate, such that rotation of the shaft causes the weir plate to travel in an arcuate path generally aligned with the drum wall.

According to another aspect, the invention relates to a system for coating tablets and other small articles, having an elongate horizontally-oriented drum for tumbling the tablets, journalled for rotation about a horizontal axis. The drum is housed within a housing, which includes opposing end walls. The housing includes a lower portion which is substantially sealed to permit cleaning liquid, to accumulate within the base of the housing, thereby effectively forming a sealed sump or pan for retaining cleaning liquid during the cleaning phase. A closable drain enters the housing, to permit cleaning liquid to drain from the housing when opened. The drum is positioned such that a lower portion of the drum extends into the lowermost sealed portion of the housing, such that cleaning liquid which accumulates within the lower base region of the housing may be in contact with the drum, in order to permit a thorough cleaning of the drum. The cleaning liquid is dispensed through a spray bar disposed within the interior of the drum, parallel to the drum axis. The spray bar is operatively connected to a source of cleaning liquid, and is also connected to a mount which mounts the spray bar directly or indirectly to the housing. Preferably, the mount is rotatable, such that the spray bar is rotatable about its elongate axis. The mount may comprise the spray bar being rotatably journalled within a pair of rotary mounts, with each such mount connected to an overhead bracket exterior to the housing. The brackets preferably comprise it pair of engagement arms extending downwardly, for supporting the mounts, the engagement arms being connected to an overhead beam. A rotary drive such as an electric motor rotates the spray bar within the rotary mounts. Preferably, the spray bar is supported by a frame structure, which also supports a second spray bar for dispensing a coating liquid within the interior of the drum. The system components are arranged such that the drive components are all above the highest liquid level to avoid immersion.

During operation, the coating liquid is dispensed onto a bed of tablets being tumbled within the drum. The frame is preferably adjustable in a vertical direction, for example by providing length adjustment means of the engagement arms, such that varying the length of the engagement arms raises or lowers the elongate frame, thereby varying the distance between the respective spray bars and the base of the drum.

Preferably, the system described above comprising the sealed lower housing and cleaning system also includes the feeder (preferably the weigh-in feeder) for dispensing a stream of bulk tablets or other small articles on a continuous basis, and the weir plate and tablet discharge region described above.

The coating liquid delivery system preferably comprises an elongate manifold within the interior of the drum. An array of spray nozzles along the manifold directs spray onto the tablets. The nozzles are arrayed into a plurality of zones spatially distributed along the drum, each zone being independently controlled for on/off delivery of coating within the respective zone. Preferably, the manifold comprises a pair of independently rotatable pipe assemblies which are axially aligned. Heated air may be delivered into the housing, preferably via an array of independently controlled plenums which form effective zones within the housing with independently controlled temperature and airflow levels. Discharge ducts permit the air to exit the housing.

The invention also relates to a method of applying a coating to tablets in bulk comprising the steps of providing a system as defined above, feeding a supply of uncoated tablets and a supply of coating liquid into said system, removing said tablets from said system on a continuous basis, and controlling said system for continuous deliver, coating and removal of tablets at a selected rate comprising a selected weight of bulk tablets per selected unit of time. Average dwell time for the tablets within the drum is controlled by rotating the weir plate so as to control the obstruction of the open second end of the drum so as to effectively increase or decrease the depth of the tablet bed within the drum. The dwell time is a function of the drum speed and other factors, and may be selected in accordance with the desired coating process parameters.

The method further comprises a start-up protocol wherein tablets are dispensed into the drum on an initial batch basis. As the tablets are initially dispensed, the spray zones are sequentially activated to deliver coating fluid, commencing with the zone adjacent the first end of the drum and sequentially moving towards the second end in correspondence with the passage of the initial tablet batch along the drum. Following the initial batch process, the system may be then operated in a continuous processing mode. The method comprises a shut-down protocol which is essentially the reverse of the start-up protocol.

The term "tablets" as used in this patent specification is not intended to be restricted to any particular type, size, shape or form of articles that may be processed in the system described and claimed herein. Rather, the term "tablets" is used to refer to any small article suitable for coating within a tumbling apparatus, including for example pills, lozenges, caplets and other sizes and shapes of similar articles, as well as candies, seeds and any other small article that receives a coating.

BRIEF DESCRIPTION OF THE DRAWINGS

FIG. 5 is a plan view from above of the discharge portion.

FIG. 6 is a front elevational view of the discharge portion with the door in the open position.

FIG. 7 is a perspective view of the drum support frame of the system with associated components.

FIG. 12 is a side elevational view of the discharge region with the door open.

FIGS. 13A and 13B a flow chart showing operation of an embodiment of the present system.

DETAILED DESCRIPTION

Figure 1:
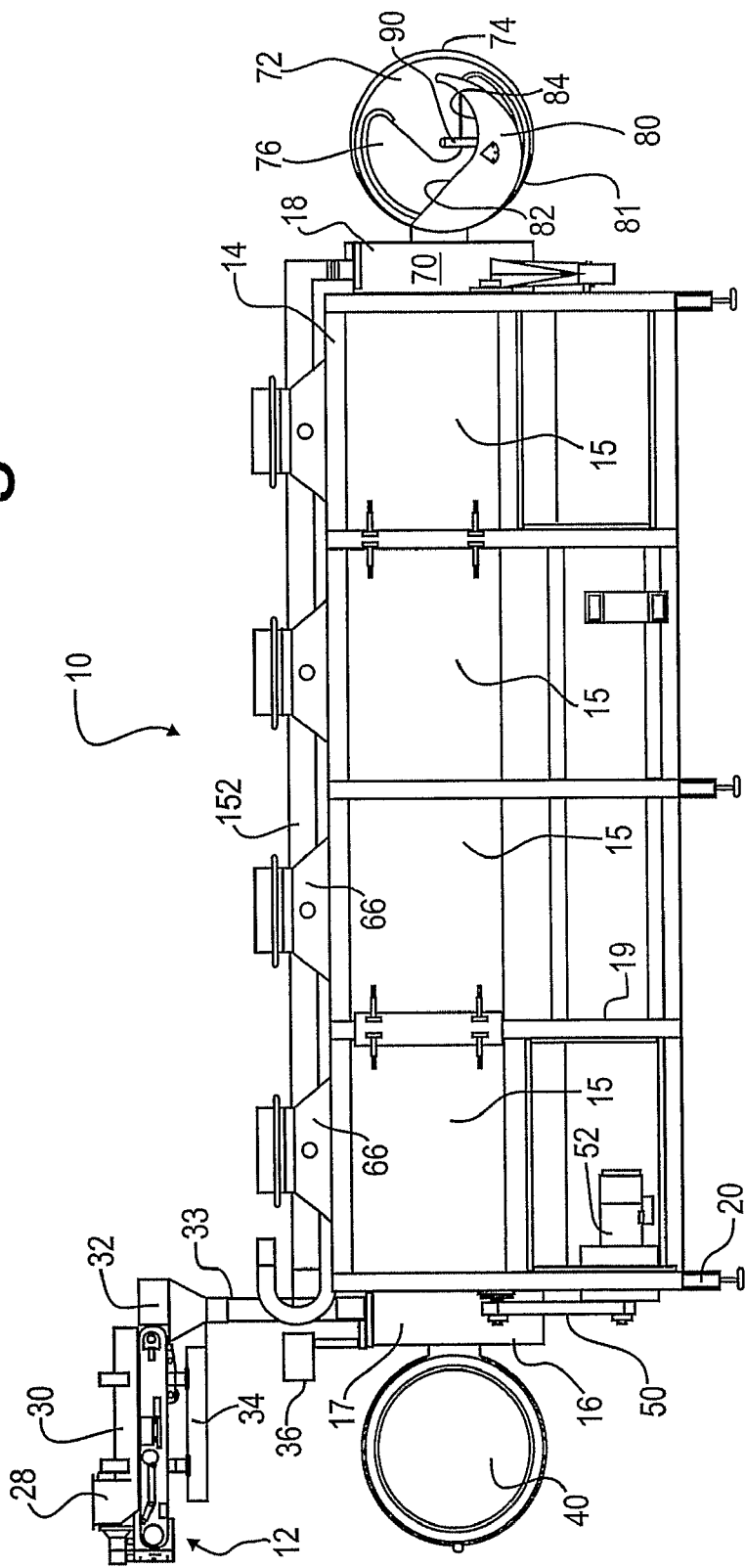
FIG. 1 is a side elevational view of the embodiment described herein of the tablet coating system.
Figure 2:
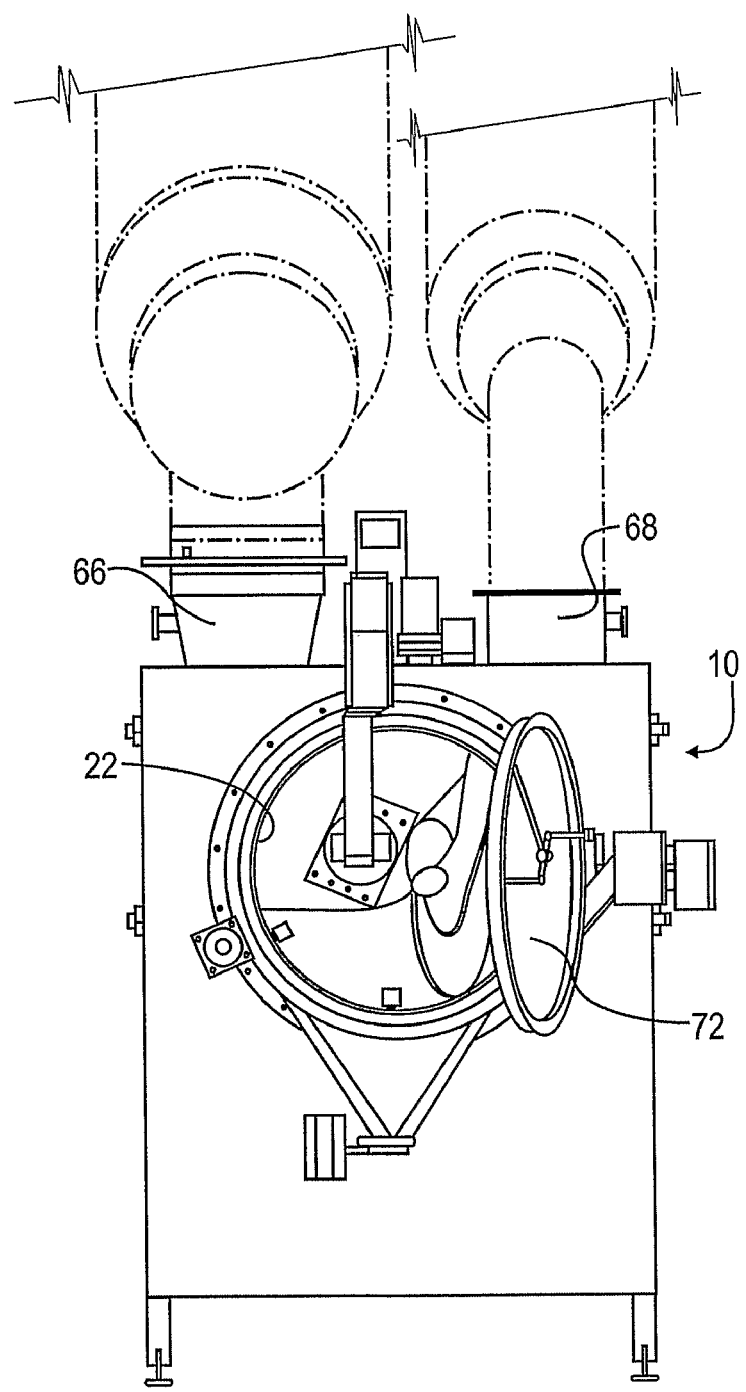
FIG. 2 is a front elevational view thereof.
Figure 3:
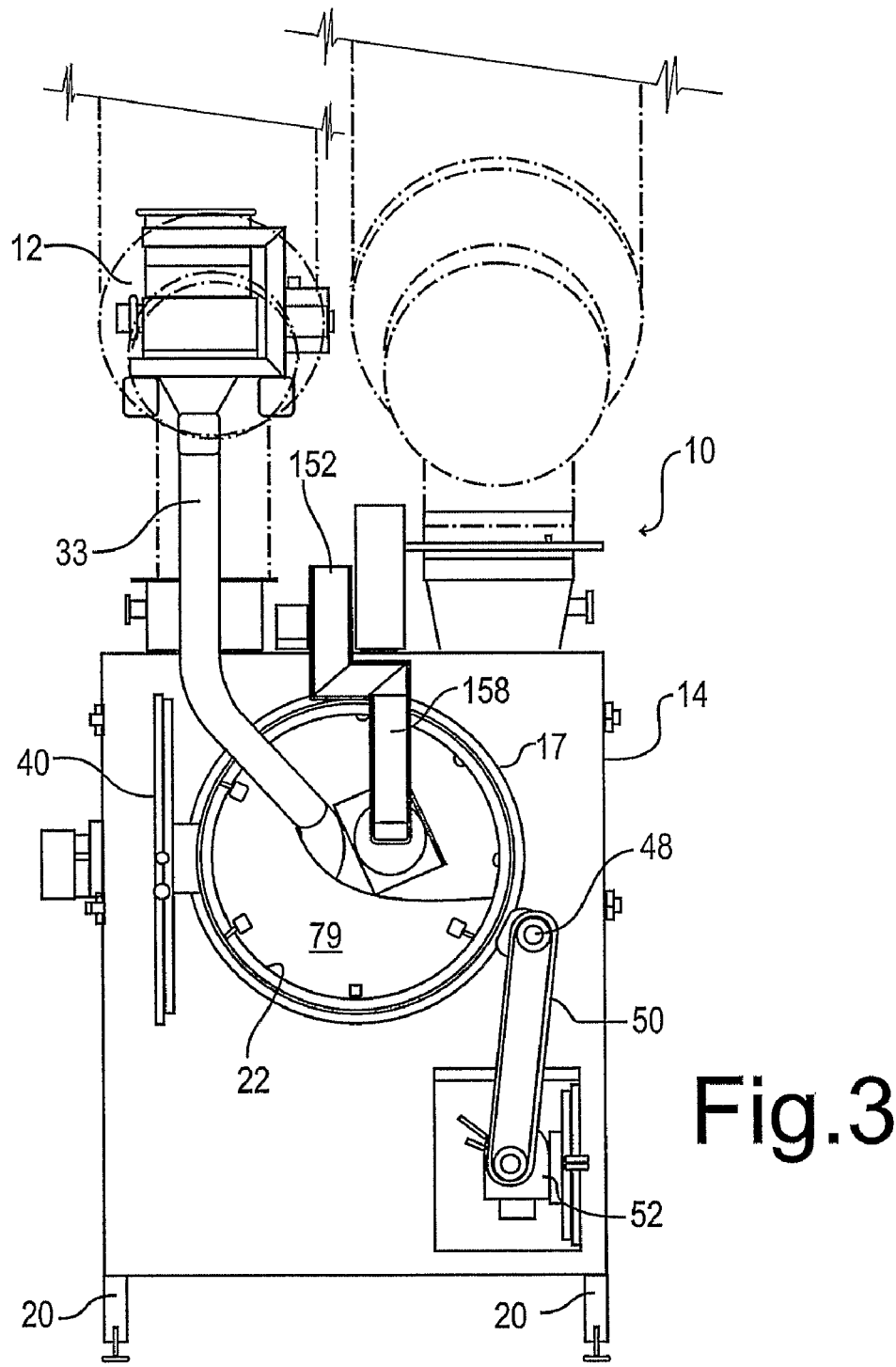
FIG. 3 is a rear elevational view thereof.
Figure 4:
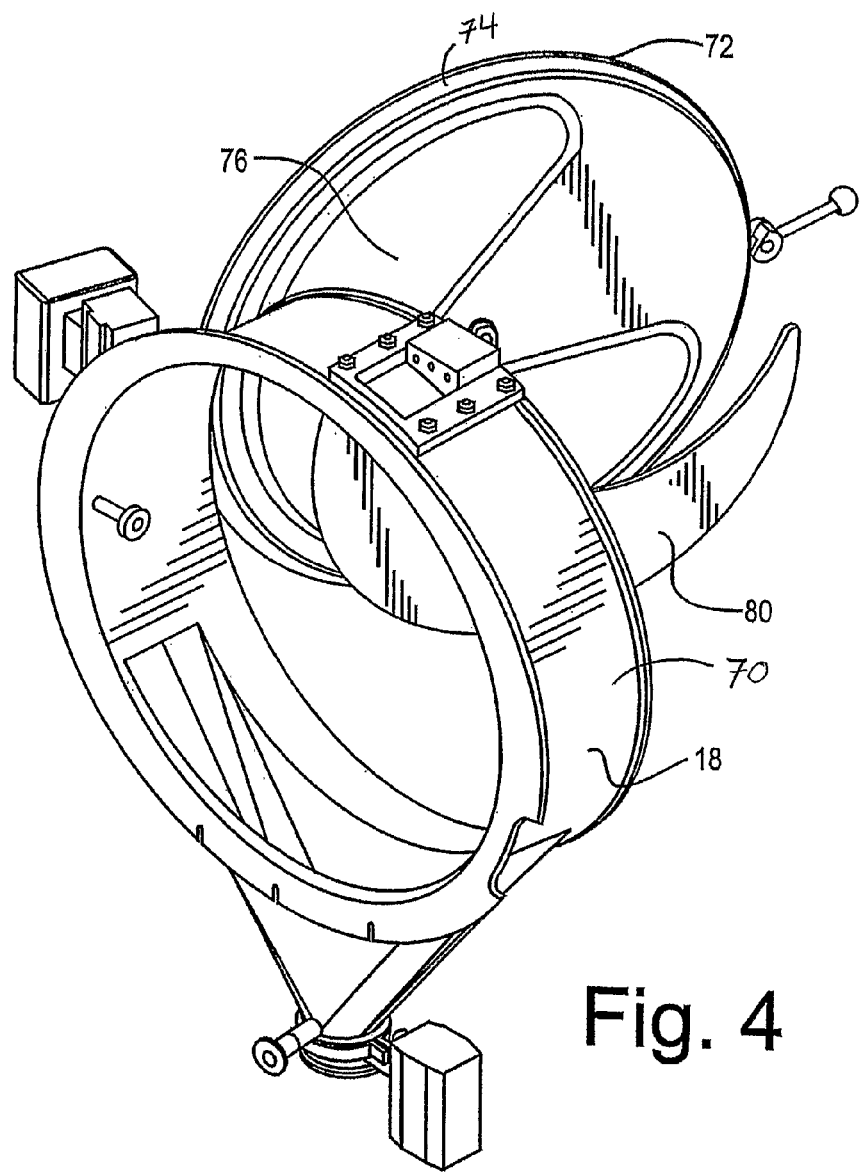
FIG. 4 is a perspective view of the tablet discharge region of the system.
Figure 8:
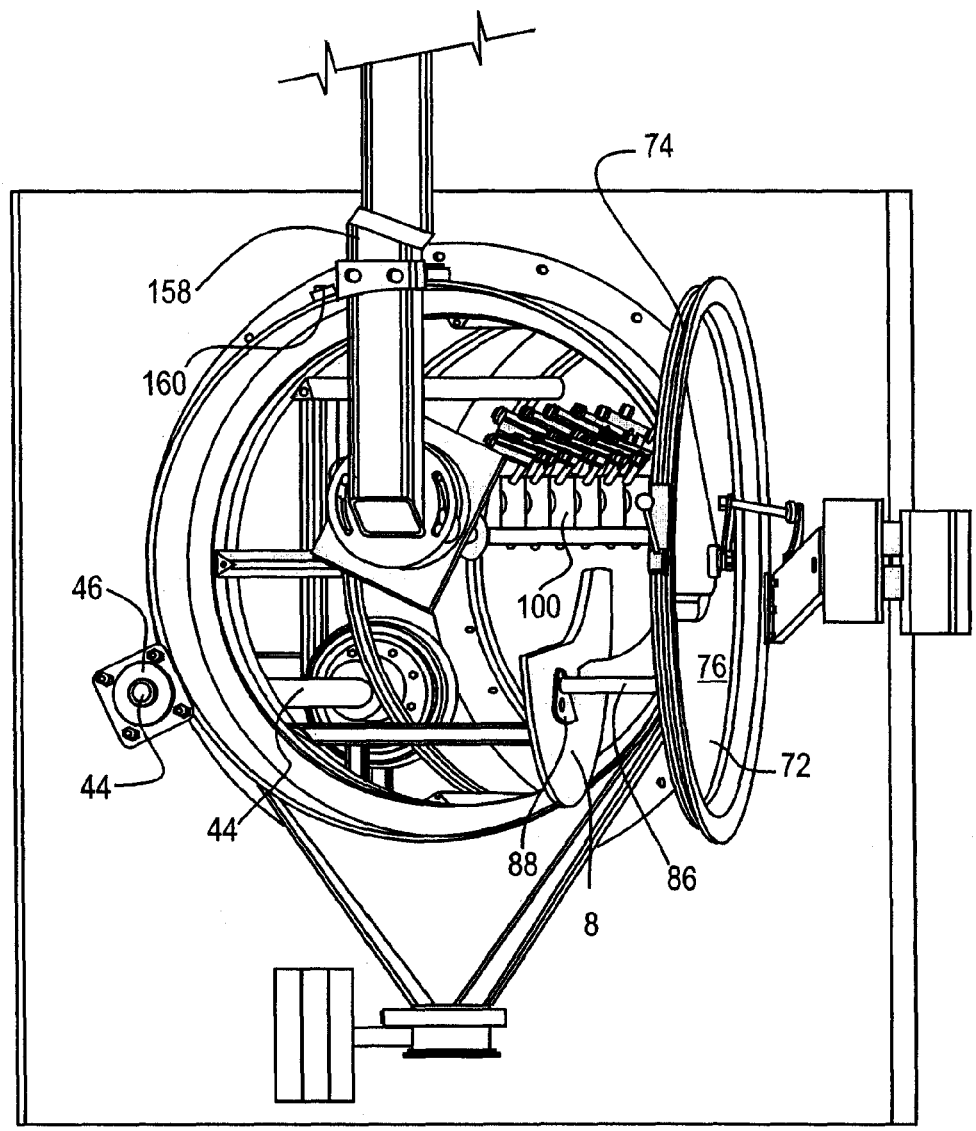
FIG. 8 is front view of the system with the drum removed to show internal components.

The tablet coating system 10 described herein as one embodiment of the invention comprises in general terms a weigh in-feed conveyor 12, a housing 14, a tablet inlet entryway 16 and a coated tablet discharge region 18. The housing 14 is supported by a frame 19, including length-adjustable legs 20 for leveling the system. The housing 14 fully encloses a horizontal-axis perforated rotateable stainless steel drum 22, seen in detail in FIG. 7. The drum 22 is open-ended at both opposed ends. Access to the interior of the housing 14 is obtained by an array of doors 15 on both lateral sides of the housing. As well, front and rear circular end doors provide access from the ends. All doors of the housing are sealed with inflatable seals.

The in-feed conveyor 12 comprises a commercially-available unit, for example the type manufactured by Siemens AG™. The conveyor 12 comprises an inlet 28 to receive uncoated tablets, discharging onto a motor-driven conveyor belt 30, which in turn discharges into a hopper 32 for entry into the inlet entryway 16 through inlet conduit 33. The in-feed conveyor belt 30 rests on a scale 34 to detect the weight of the tablets deposited onto the conveyor at any given moment. This weight amount is calculated by subtracting the weight of the conveyor and associated components from the total weight detected by the scale. As discussed below, a system controller 36 extracts from this tablet weight information the rate of tablet in-feed into the system, in selected weight/time units.

The inlet 28 includes a controlled-flow dispenser to dispense tablets at a selected rate of supply onto the conveyor belt 30 in response to a control signal from the system controller 36. The feedback signal from the scale 34 permits a supply of tablets at a constant rate in units of weight per unit of time (for example a selected kg/min. rate of tablet supply).

It will be seen that tablets may alternatively be delivered at a rate based on other variables such as volume.

Tablets received in the inlet hopper 32 enter via gravity through the conduit 33 into the tablet entryway 16. The entryway 16 comprises an annular flange 17 which protrudes outwardly from a first end of the housing 14. The entryway 16 communicates with the interior of the housing 14. The exterior end of entryway 16 is covered by an openable door 40, which opens for access into the interior of the housing 14. The conduit 33 communicates with the entryway 16 through an opening within the flange 17. The inlet chamber 16 is aligned with the rotateable drum 22 within the interior of the housing 14, such that tablets entering the chamber 16 are directed into the interior of the drum 22. The entryway 16 is also partly obstructed by a weir plate 79 having a shape similar to the discharge region weir plate 80 described below.

The drum 22 is housed within a cage comprising a plurality of spaced-apart hoops supported by a frame. The hoops include a central hoop 25 and first and second end hoops 27(a) and 27(b), all three of which have an outer contact surface 29 for contacting an array of drive and driven wheels 42. The central hoop 25 also includes raised flanges 31 on either side thereof. The flange have side edges for contact with a pair of horizontally-oriented opposed centering wheels 35 to maintain the fore-aft position of the drum. The frame is further comprised of an array of stave-like rods 110 fastened to the hoops 25 and 27. Drive wheels 42(a) are mounted to a rotateable shaft 44 extending the length of the housing. The shaft 44 is journalled for rotation within a bearing hub 46 mounted within a corresponding end wall of the housing. A first hub 46 supporting the drive axle includes a drive shaft 48 extending outwardly from an end wall of the housing. A pulley 50 is mounted to the drive shaft 48, which in turn is driven by an electric motor 52 mounted to the frame 18. The motor is controlled by the control system, described below. The driven wheels 42(b) are mounted to corresponding mounts within the interior of the housing 12.

The drum 22 is about 30 inches in diameter and comprises a perforated stainless steel wall. In one version, the overall length of the housing 14, including inlet and outlet chambers, is 206 inches, with the housing interior length being about 187 inches. The drum 22 extends the full length of the main part of the housing interior. These dimensions are only a representative example.

Figure 9:
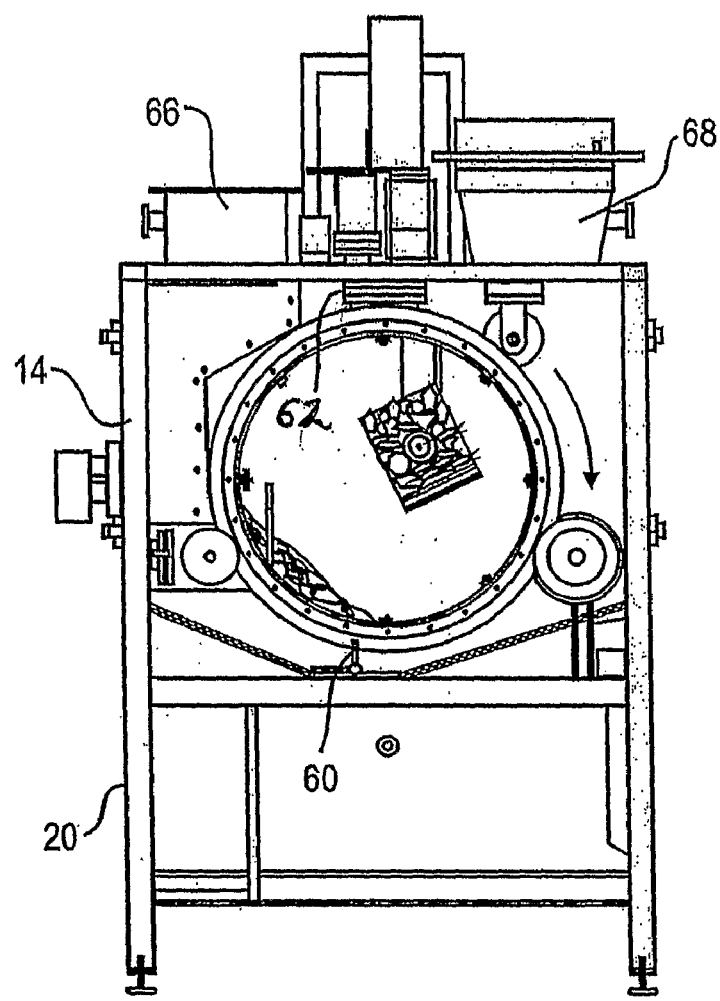
FIG. 9 is a rear elevational view showing internal components.

As seen schematically in FIG. 9, within the interior of the housing 14 and extending axially the full length thereof is a stainless steel baffle 60 which effectively divides the interior space within the housing 14 exterior to the drum 22, in order to channel the flow of heated air through the tablet bed. The baffle 60 extends the full length of the housing 14, and is fastened to the floor of the housing 14. It extends inwardly with a free edge contacting or approaching the drum 22. The housing interior is thus effectively divided between air inflow and air outflow zones, each of which extends the full length of the housing 14.

Heated air is introduced into the air inflow zone via an array of intake plenums 66, which receive heated air from a common source, which is not shown. Operating temperatures are controlled to within about ±1 degree C. by way of tandem packaged boilers, not shown, with turndown rations of 10:1 operatively connected to intake plenums 66. The interior of the housing effectively is in effect substantially divided into four independently controlled zones along the length of the drum 14, with the supply of heated air being effectively independently delivered within each zone. Independently controlled iris valves, not shown, within the plenums 66 allow for independent delivery of hot air into the housing to permit balancing and tuning of the hot air supply within the effective zones within the housing. Thus, within each zone the rate and temperature of heated air delivered into the drum may be independently controlled.

The baffles 60, 62 channel the heated air to flow through the drum 14, exiting the housing via an array of exit ducts 68, which channel the exhaust air via a common manifold for a discharge either into the exterior environment or through a treatment system, not shown. The baffle 60 is positioned so as to direct the stream of heated air through the tablet bed within the drum 14, such that all or most of the air flows through the tumbling bed of tablets. Since during rotation of the drum, the tablet bed will be tilted in the direction of rotation of the drum, the baffles are positioned accordingly. For example, if the drum rotates clockwise, when viewed from a first end, the tablet bed will be tilted toward the left, such that the exposed surface of the tablet bed tilts upwardly and to the left, as seen in FIG. 9. The speed of drum rotation as well as tablet depth will determine the position of the tablet bed.

Tablets within the drum exit via the tablet discharge opening 18. The discharge 18 comprises a cylindrical opening within the end wall of the housing, surrounded by a tubular flange 70 aligned with the drum 22. The flange opening is fully covered by a discharge door 72, comprising a circular panel hinged to the flange 70. An inflatable seal 74 provides a waterproof and airtight seal when the door is closed. The panel 72 includes a window 76 for viewing the drum interior. The door includes a weir plate 80 for retaining within the drum a selected depth of tablets while permitting the discharge of tablets which exceed this depth. As will be discussed below, the combination of the in-feed conveyor dispensing a metered amount of tablets, with the weir plate 80, permits a continuous coating operation of the system. The weir plate 80 is generally crescent-shaped. As will be seen in FIG. 1, the shape of the plate departs somewhat from a crescent shape, in that the plate comprises a substantially circular lower edge, with an upper edge having a straight region 82 merging with a hyperbolic curved region 84. The overall shape thus is similar in appearance to a scimitar blade. The panel thus generally corresponds with the shape assumed by the upper surface of the tablet bed as the drum is rotated in a clockwise direction when viewed from the first end of the housing.

The weir plate 80 is rotateably mounted to the door 72, in a position spaced apart from the door and inboard thereof such that the weir plate 80 either protrudes slightly into the interior of the drum 22 or is in contact or very close proximity with the exposed edge of the drum so as to provide an effective barrier to tablets contained within the drum 22. The space defined between the door panel 72 and weir plate 80 provides a discharge region for tablets spilling over the weir plate. As seen in FIGS. 4 to 6, 11 and 12, the weir plate 80 is mounted to the door 72 by an offset mount comprising a mounting shaft 86 which is fixedly mounted to the weir plate 80, for example by an array of bolts 88. The horizontal shaft 86 in turn is mounted at its opposed end to a first end of a mount arm 90. The opposed second end of the mount arm 90 is fixedly mounted to a second rotateable shaft 92, such that rotation of the second shaft 92 has the effect of swinging the weir plate 80 about an arc. The positioning and shape of the weir plate 80 and the associated mounting shafts and arm are arranged such that the lower edge of the weir plate describes a circular movement corresponding with the drum wall, when rotated.

The second shaft 92 extends through the door panel 72 at the centre thereof, and is rotateably journaled within a bearing mount 73 extending through the door 72. The second shaft 92 is rotateably driven by a drive means which may comprise any suitable means to precisely impart rotational positioning, such as an electro-pneumatic positioner 94, operatively connected to the second shaft 92 via linkages 95, 96. If motor driven, control of the motor is effected by the central control system, described below.

Tablets which spill over the top edge of the weir plate 80 exit via a discharge hopper 98 which opens into the space between the weir plate 80 and door panel 72. The coated tablets exiting the discharge hopper 98 thus exit the system and are handled in a conventional manner.

It will be seen that positioning the weir plate 80 such that it angles more steeply upwardly in the direction of drum rotation, will effectively raise the spillover height of the weir plate 80 thus permitting a greater tablet depth to accumulate within the drum. This has the effect of permitting a relatively longer tablet dwell time within the drum 22. As will be seen, tablets deposited in a first end of the drum will move towards the discharge end by rotation of the drum, by virtue of the continuous addition of tablets at one end and discharge at the other end. Hence, the speed of drum rotation, rate of tablet introduction and height of the weir plate cooperate to establish an average dwell time.

As well, sufficient elevation of the weir plate 80 by rotational adjustment can permit the system to operate as a batch processor if desired, for example at the start of a production run. The weir plate 80 may then be rotated into an intermediate position for continued processing on a continuous basis.

Figure 10:
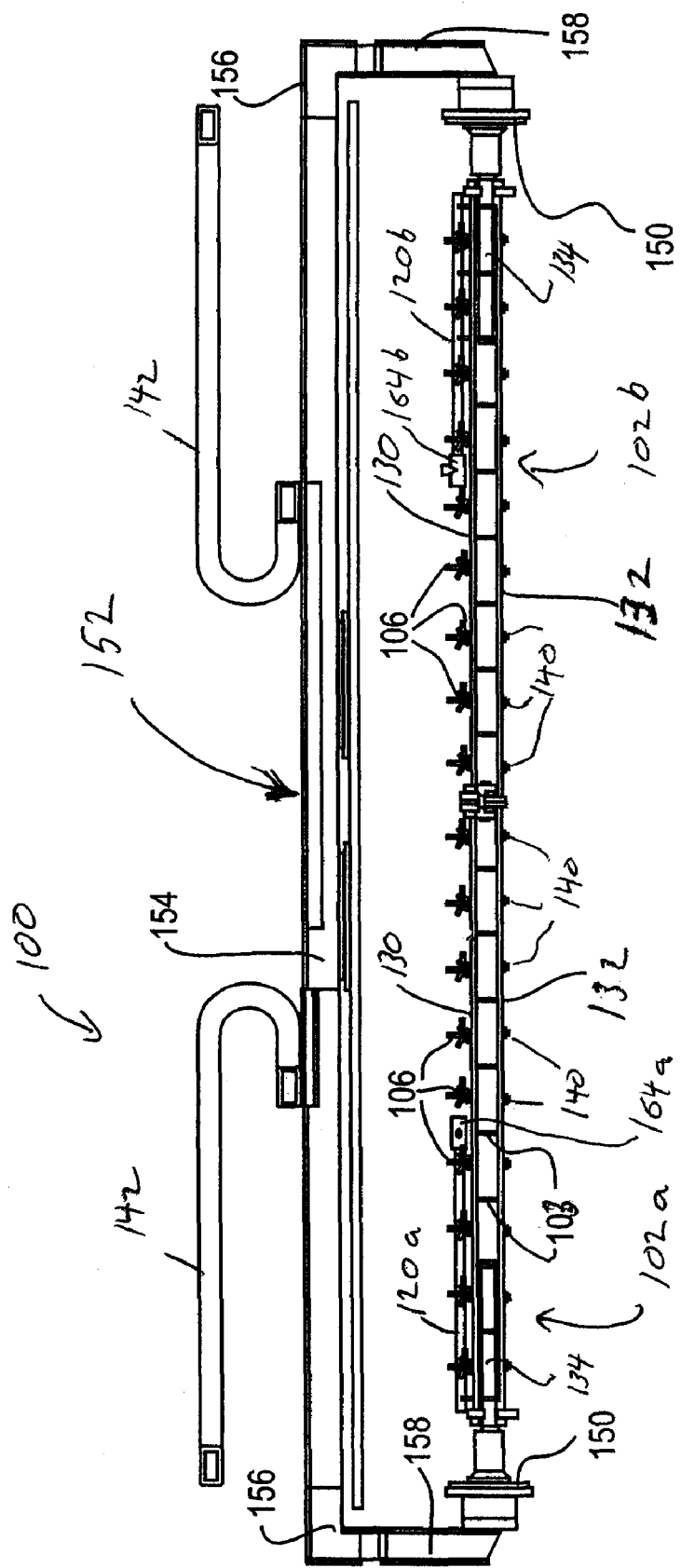
FIG. 10 is a side elevational view of the coating liquid spray system.
Figure 11:
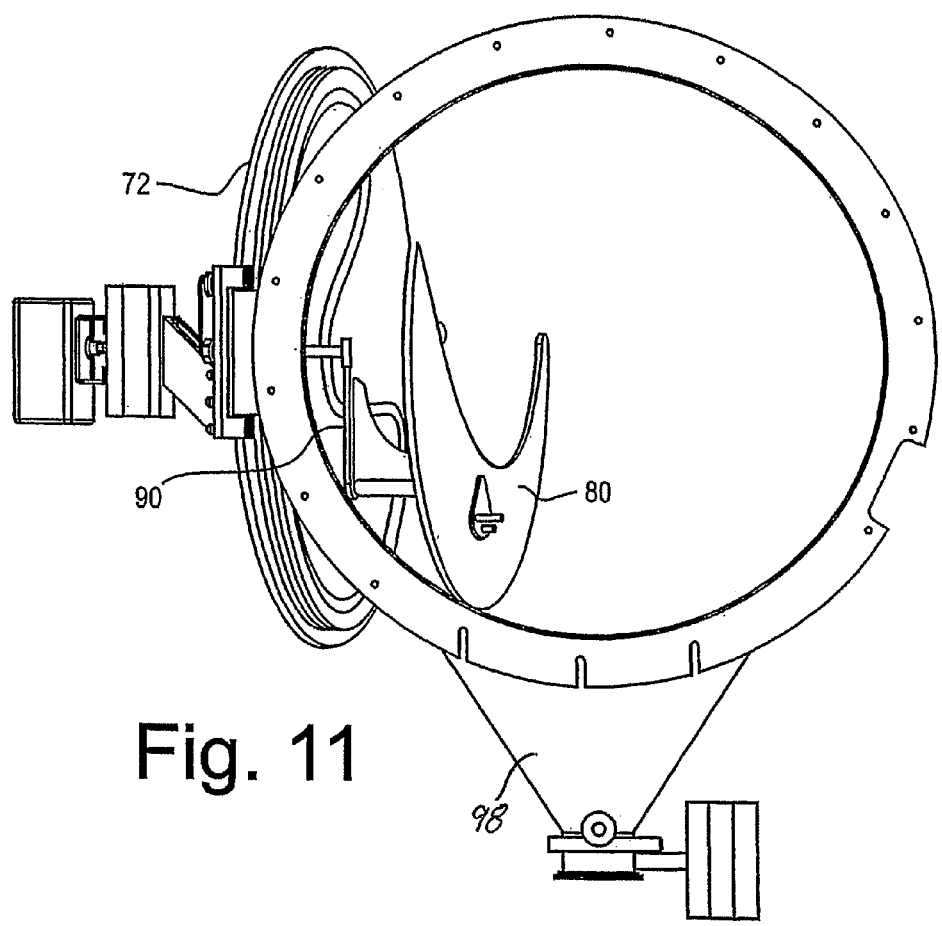
FIG. 11 is a perspective view of the discharge region.
Figure 13B:
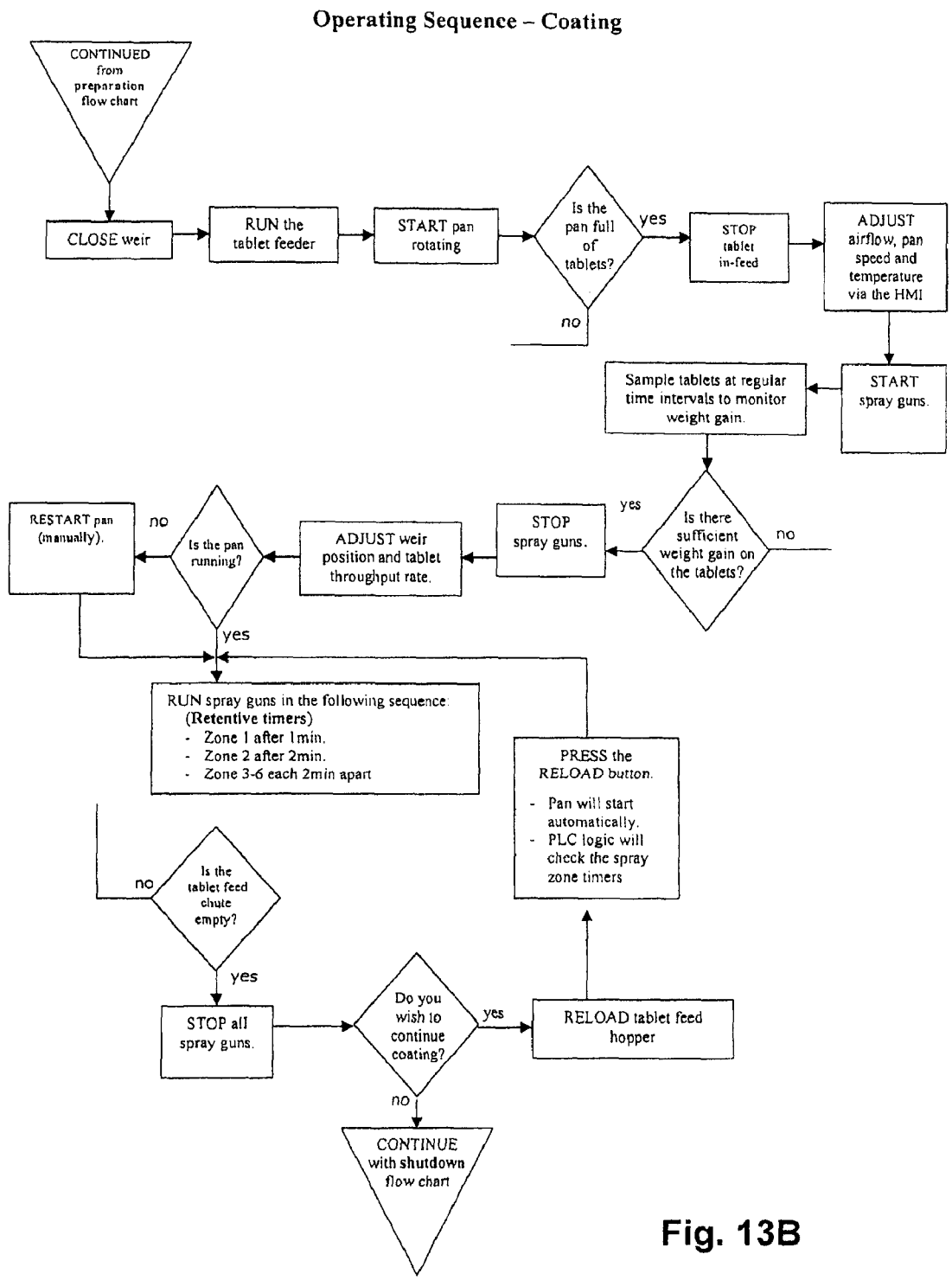

A metered supply of a coating substance such as a coating liquid is dispensed via a spray manifold 100, shown in FIG. 10. The manifold 100 extends axially within the interior of the drum and comprises two independently rotatable pipe assemblies 102*a* and 102*b* supported by a bracket 152 exterior to the housing, with the assemblies 102 being positioned within the interior of the drum and extending the length thereof. Each assembly 102*a* and 102*b* in turn comprises two parallel pipes 130 and 132, which communicate with each other internally via conduits 103. Conduits 103 also provide structural support for the assemblies. Each assembly is mounted to shaft 134, which in turn is rotatably journalled within bearing mounts 150 at either end of the housing. The shafts 134 are operatively connected to an external drive, not shown. The pipe 130 supports an array of Schlick™ spray guns 106 to spray coating in atomized form onto the tablets. It will be understood that other types of spray guns may be used as is appropriate. Pipes 130 and 132 are operatively connected to a pressurized supply of coating liquid by a flexible supply line, not shown. Pressurized air is delivered to the nozzles via hoses, not shown, connected through air fittings 140.

The bearing mounts 150 are each mounted to a support bracket 152, comprising a horizontal arm 154 extending the length of the housing 14 and having telescoping sections 156 at either end thereof, with telescoping vertical sections 158 at either end thereof to which the bearing mounts are engaged. The horizontal arm is mounted to the upper surface of the housing 14, with the vertical arms overhanging the ends of the housing 14 and entering the respective chambers 16 and 18. The vertical arms fit within slots 160 within the upper surface of the flanges 16/18. Each of the bearing mounts 150 is operatively connected to a drive, for independently rotating the assemblies 102*a* and 102*b*. The assemblies 102*a* and 102*b* are separable from each other and may be retracted away from each other by extending the arms 156 of the bracket 152. This permits the assemblies to be partly or fully withdrawn from the housing, for example for cleaning or maintenance. The supply line includes sufficient slack to permit such movement of the assemblies 102*a* and 102*b*. The bracket 152 includes a pair of hangers 142 to support cable loops in a convenient fashion.

The assemblies 102*a* and *b* can be rotated through 360 degrees, with an operative range of rotation being about 90 degrees to permit positioning of the spray guns 106, described below, such that they are perpendicular to the surface of the tablet bed. Further, the telescoping vertical sections 158 can vary the position of the spray assembly 102 within a range of about 90-100 millimeters in a direction perpendicular to the rotational axis of the assembly 102 so as to vary the distance between the spray guns 106 and the tablet bed so as to vary the spray pattern striking the tablet bed. The spray bar includes an intake end to receive fluid. A fluid spray is dispensed via a bank of spray guns 106 divided spatially into six zones along the length of the drum 22, directed generally downwardly towards the position of the tablet bed within the drum. Fluid is dispensed under pressure, preferably via a system for atomizing the spray liquid.

The spray guns 106 comprise three arrays or spray zones of three guns each, within each of the assemblies 102*a* and *b*, for a total of 18 guns arranged in six independently controlled spray zones Each array of three guns within a given zone is independently controlled on or off. The independently controlled spray zones permit a controlled build-up of the sprayed coating to permit accurate coating weight gain, particularly in the transition time between the initial batch processing and the subsequent continuous mode operation. In particular, the system reduces losses incurred through undercoating or off-spec coating while in the batch production mode.

A wash-in-place system activated for cleaning of the interior of the housing 14 and the drum 22. The system comprises a pair of conduits 120*a* and 120*b* for wash liquid (for example water) supported by the assemblies 102*a* and 102*b* respectively. The conduits 120 each receive a pressurized supply of liquid from a flexible hose, not shown. Cleaning liquid is dispensed under pressure via two nozzles 164*a* and *b* which are operatively connected to the conduits 120*a* and 120*b* respectively. The nozzles 164 are each capable of 360 degree rotation to deliver cleaning liquid towards the interior drum wall with full 360 degree coverage.

During the wash cycle, wash liquid collects within the base of the housing 14, filling the housing about ¼ to ⅓ of its height with solution to form an internal sump region. The components of the system are designed to maintain the primary drive components above the sump region while permitting immersion of the sump region. In practice, sufficient liquid will be introduced such that a portion of the drum will enter the collected wash liquid and during drum rotation is thus effectively washed. The spray nozzles also direct a liquid spray towards the end walls, so as to effectively wash the interior of the housing. The first and second doors are sealed against leakage of liquid, by means of a highly watertight seal formed by an inflatable gasket, fixedly mounted around the perimeter of the respective doors. Each door is also provided with a latch to tightly close the door.

Liquid used for cleaning of the system which collects within the base of the housing may be drained, via one or more drains for either disposal or re-use.

Operation of the system 10, including tablet in-feed rate, drum rotation, coating spray delivery, heated air delivery, weir plate position and the wash-in-place cleaning system, is controlled via the central controller 36, operatively linked to the tablet inlet 28, in-feed conveyor 26, drum drive motor 52, weir plate positioner 94, and coating spray and liquid dispensing systems. The controller 36 comprises any suitable electronic system capable of receiving electronic signals, processing the signals according to a logic sequence, and transmitting control signals. The controller 36 includes a user interface to permit programming of the system operation.

Although the present invention has been described in part by reference to one or more embodiments described in detail, it will be understood that the invention is not limited in its scope to these embodiments nor to any particular aspect of same. Rather, the full scope of the invention is described by reference to this patent specification as a whole including the claims.

The invention claimed is:

1. A system for coating tablets comprising:
    a) an elongate housing having opposing lateral sides, first and second opposing ends, and an elongate horizontal axis extending lengthwise within said housing between said opposing ends;
    b) a drum within said housing journalled for rotation about said axis, said drum having a first end for receiving a supply of tablets adjacent to said first end of said housing and a second end open to discharge said tablets adjacent to said second end of said housing;
    c) drive means for rotating said drum about said axis for tumbling said tablets within said drum and thereby transiting said tablets from said first end to said second end as said tablets are introduced into said first end and discharged from said second end;
    d) a coating delivery system for dispensing coating onto said tablets within said drum as said tablets are tumbled within said drum;
    e) a feeder for dispensing a stream of bulk tablets at a selected rate into said first end of said drum;
    f) an upstanding weir plate partly obstructing said open second end of said drum for retaining a bed of tablets within said drum at a selected depth wherein upon rotation of said drum said coated tablets spill over said weir plate for discharge from said system, said weir plate being mounted to said housing for remaining stationary during rotation of said drum, said weir plate being adjustable in position for increasing or decreasing the effective spillover height of said weir plate to selectively control the tablet depth and average tablet dwell time within said drum; and
    g) a controller operatively connected to said feeder, said coating delivery system and said weir plate for controlling the delivery of tablets, the delivery of coating and tablet dwell time.

2. The system as defined in claim 1, wherein said coating delivery system comprises a sprayer for delivering a liquid substance positioned within the interior of said drum for delivering said liquid under pressure as a spray.

3. The system as defined in claim 1, wherein said feeder comprises a weigh-in feeder.

4. The system as defined in claim 3, wherein said weigh-in feeder comprises a scale for weighing a stream of tablets passing over said scale, a tablet transport system to carry tablets in bulk across said scale while being weighed, a dispenser for delivering a controllable stream of tablets to said scale and a controller operatively connected to said scale and dispenser to receive signals from said scale and to control the amount of tablets delivered to said scale so as to maintain said selected rate.

5. The system as defined in claim 1, wherein said feeder is for selectively dispensing said tablets on a batch or continuous basis into said drum.

6. The system as defined in claim 1, wherein said weir plate includes a curved upper edge.

7. The system as defined in claim 6, wherein said upper edge comprises a straight region merging with a curved region.

8. The system as defined in claim 6, wherein said weir plate is generally scimitar-shaped.

9. The system as defined in claim 1, wherein said coating delivery system comprises an array of spray nozzles, said array extending substantially the length of said drum, said nozzles comprising a plurality of zones spatially distributed along said drum, each of said zones being independently controlled for on/off delivery of coating.

10. The system as defined in claim 1 further comprising a cleaning solution sprayer within said drum for selectively delivering a stream of cleaning liquid into the interior of said drum, wherein said housing is sealed against liquid leakage so as to permit a selected depth of cleaning liquid to accumulate within said housing for cleaning of said system.

11. The system as defined in claim 1, wherein said controller is for operating said system with an initial batch processing of said tablets during which said coating delivery system sequentially delivers said coating from said first end of said drum to said second end of said drum, followed by continuous processing of said tablets.

12. The system as defined in claim 1, wherein said weir plate is mounted for arcuate travel along a path following the wall of said drum for adjustment of the position thereof.

13. The system as defined in claim 12, wherein said weir plate is mounted to said housing via a rotatable shaft mounted generally co-axially with said drum and a link extending in a generally radially from said shaft, said link being engaged to said weir plate wherein rotation of said shaft causes displacement of said weir plate along said arcuate path.

14. A method of applying a coating to tablets in bulk comprising the steps of providing a system as defined in claim 1, feeding a supply of uncoated tablets into the first end of said drum on a continuous basis, rotating said drum and thereby transiting said tablets towards said second end of said drum for discharge, spraying said tablets during said tumbling with said coating, and controlling the dwell time of said tablets within said drum by operating said controller whereby said weir plate is located at a selected position for retaining a bed of tablets within said drum at a predetermined bed depth.

15. The method as defined in claim 14, wherein said step of spraying said tablets comprises providing said coating delivery system as an array of spray nozzles, said array extending substantially the length of said drum, said nozzles comprising a plurality of zones spatially distributed along said drum, and controlling on/off delivery of said coating independently within each of said zones.

16. A method as defined in claim 15 further comprising supplying heated air into said drum, wherein said zones each further comprise an independently controlled hot air delivery system for delivery of heated air into each said zone at a rate and temperature independent of others of said zones.

17. The method as defined in claim 15 wherein said zones are activated sequentially from said first end to said second end for commencing delivery of spray to said tablets in zonal sequence as said tablets travel along said drum.

18. The method as defined in claim 15, wherein said zones are inactivated sequentially from said first end to said second end for stopping delivery of spray to said tablets in zonal sequence as said tablets travel along said drum.

19. The method as defined in claim 14, comprising processing an initial batch of said tablets followed by continuous processing of said tables, with little or no interruption between said batch and continuous processing.

\* \* \* \* \*

UNITED STATES PATENT AND TRADEMARK OFFICE
CERTIFICATE OF CORRECTION

| | | |
|---|---|---|
| PATENT NO. | : 8,015,937 B2 | Page 1 of 1 |
| APPLICATION NO. | : 11/911498 | |
| DATED | : September 13, 2011 | |
| INVENTOR(S) | : O'Hara et al. | |

It is certified that error appears in the above-identified patent and that said Letters Patent is hereby corrected as shown below:

In the Specifications:

Column 2, line 43, "tablets are received" should be --tablets received--;

Column 3, line 37, after "aspect," insert --the plate departs--;

Column 4, line 12, "comprise it pair" should be --comprise a pair--;

Column 4, line 46, "duets" should be --ducts--; and

In the Claims:

Column 12, line 25, "claim 15 wherein" should be --claim 15, wherein--.

Signed and Sealed this
Fourteenth Day of May, 2013

Teresa Stanek Rea
*Acting Director of the United States Patent and Trademark Office*